(12) United States Patent
Grace, Jr.

(10) Patent No.: US 9,904,076 B2
(45) Date of Patent: Feb. 27, 2018

(54) DECORATIVE EYEGLASSES ATTACHMENT WITH WIND GUARD

(71) Applicant: Timothy R Grace, Jr., Fort Worth, TX (US)

(72) Inventor: Timothy R Grace, Jr., Fort Worth, TX (US)

(*) Notice: Subject to any disclaimer, the term of this patent is extended or adjusted under 35 U.S.C. 154(b) by 0 days.

(21) Appl. No.: 15/460,577

(22) Filed: Mar. 16, 2017

(65) Prior Publication Data

US 2017/0184880 A1  Jun. 29, 2017

Related U.S. Application Data

(63) Continuation-in-part of application No. 14/657,502, filed on Mar. 13, 2015, now Pat. No. 9,599,841.

(51) Int. Cl.
*G02C 11/02* (2006.01)

(52) U.S. Cl.
CPC .................... *G02C 11/02* (2013.01)

(58) Field of Classification Search
CPC ................ G02C 11/00; G02C 11/02
USPC ........... 351/51, 52, 158; D16/300, 309, 323, D16/325, 336; 2/13
See application file for complete search history.

(56) References Cited

U.S. PATENT DOCUMENTS

| | | | | |
|---|---|---|---|---|
| 3,299,439 A | * | 1/1967 | Bohner | G02C 7/16 2/13 |
| 5,423,505 A | * | 6/1995 | David | A47F 5/0006 206/486 |
| 5,775,018 A | * | 7/1998 | Steinborn | G02C 11/02 40/299.01 |
| 2009/0065674 A1 | * | 3/2009 | Spinelli | A47B 19/10 248/444.1 |

* cited by examiner

*Primary Examiner* — Darryl J Collins
(74) *Attorney, Agent, or Firm* — Christina Chamberlain; Chamberlain Legal Services, PLLC

(57) ABSTRACT

An eyeglass frame attachment assembly generally comprising a base, a platform and a T-shaped wind guard. The base in generally comprised of a right upper frame, a left upper frame and a center support. The right upper frame and the left upper frame each comprise at least two arm grooves wherein the eyeglass frame attachment assembly may be attached to the eyeglasses by passing the temple arm of the eyeglasses through one of the arm grooves. The center support strap can be affixed through a center hole for added support and stability to the platform. The platform comprises a channel, whereby the channel receives an interchangeable banner piece.

20 Claims, 3 Drawing Sheets

DECORATIVE EYEGLASSES ATTACHMENT WITH WIND GUARD

RELATED APPLICATIONS

This application is a Continuation in Part of U.S. Non Provisional application Ser. No. 14/657,502 filed Mar. 13, 2015, which claims priority to Provisional Application No. 61/955,423 filed Mar. 19, 2014. The entire contents of the above application are hereby incorporated by reference as though fully set forth herein.

The present invention generally relates to eyeglasses. More particularly, the present invention relates to decorative attachments for eyeglasses.

BACKGROUND

Eyeglasses are used to correct vision, block sunlight or as fashion accessories. Eyeglass frames come in a wide variety of colors, shapes and sizes that provide aesthetically pleasing designs. Many people show their support for sports teams, schools and other organizations and entities by wearing clothing that shows the logo, color or other identification of the entity they support. One way to accessorize in this fashion is to use decorative glasses. Usually, this results in having to purchase multiple eyeglasses if one wishes to support more than one entity through their fashion choices. Users may also desire to make hand-free advertisements and statements to be worn as a banner on their eyeglasses, as well as to make changes in their appearance. The present invention increases the percentage of retention of any message or show of support displayed, while increasing viewership and visibility of the message, logo, or other show of support on the banner by being affixed to the eyes, which is one of the most common places people look when interacting with the users.

The present invention seeks to overcome the issue of needing multiple sets of eyeglasses to accessorize with multiple logos, colors or other identification of the entity a user wishes to support as well as to convey custom messages, advertisements or statements. While outer decorative pieces of eyeglasses may be interchanged to provide eyeglasses with different designs and a variety of looks, there still remains a need to provide additional options to configure the appearance of eyeglasses to display items such as team logos or to help express thoughts or messages in a non verbal manner, such as advertisements, proposals, protests, support, etc.

BRIEF SUMMARY OF THE INVENTION

Disclosed herein is an eyeglass frame attachment assembly comprising a base, a platform and a detachable T-shaped wind guard. The base is generally comprised of a right upper frame, a left upper frame and a center support. The right upper frame and the left upper frame each comprise at least two arm grooves wherein the eyeglass frame attachment assembly may be attached to the eyeglasses by passing the temple arm of the eyeglasses through one of the arm grooves on each side. The center support strap can be affixed through a center hole for added support and stability to the platform. The platform comprises a channel, whereby the channel receives an interchangeable banner piece.

DETAILED DESCRIPTION

Figure 1:
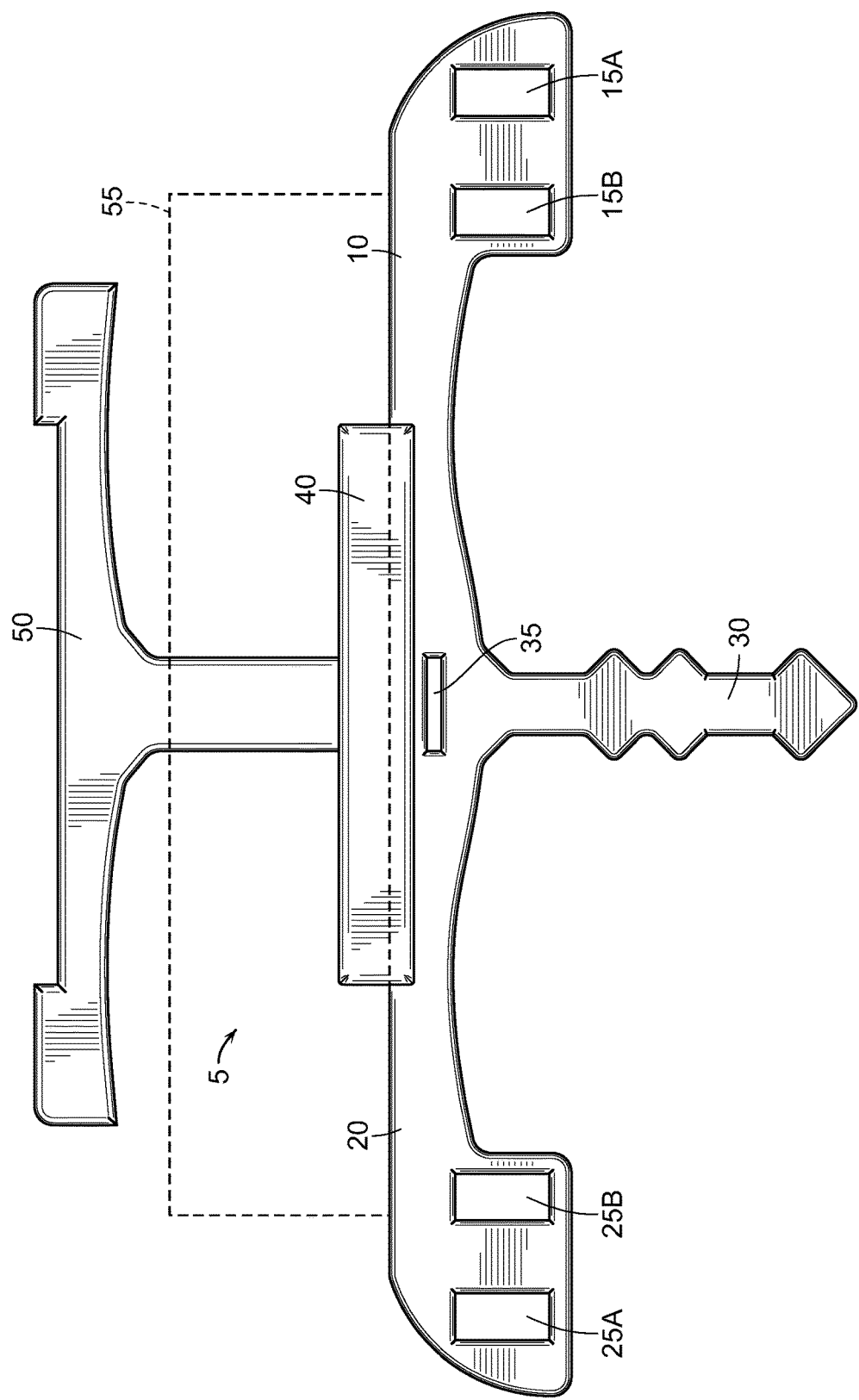
FIG. 1. is a depiction of an eyeglass frame attachment assembly in accordance with the present invention.
Figure 2:
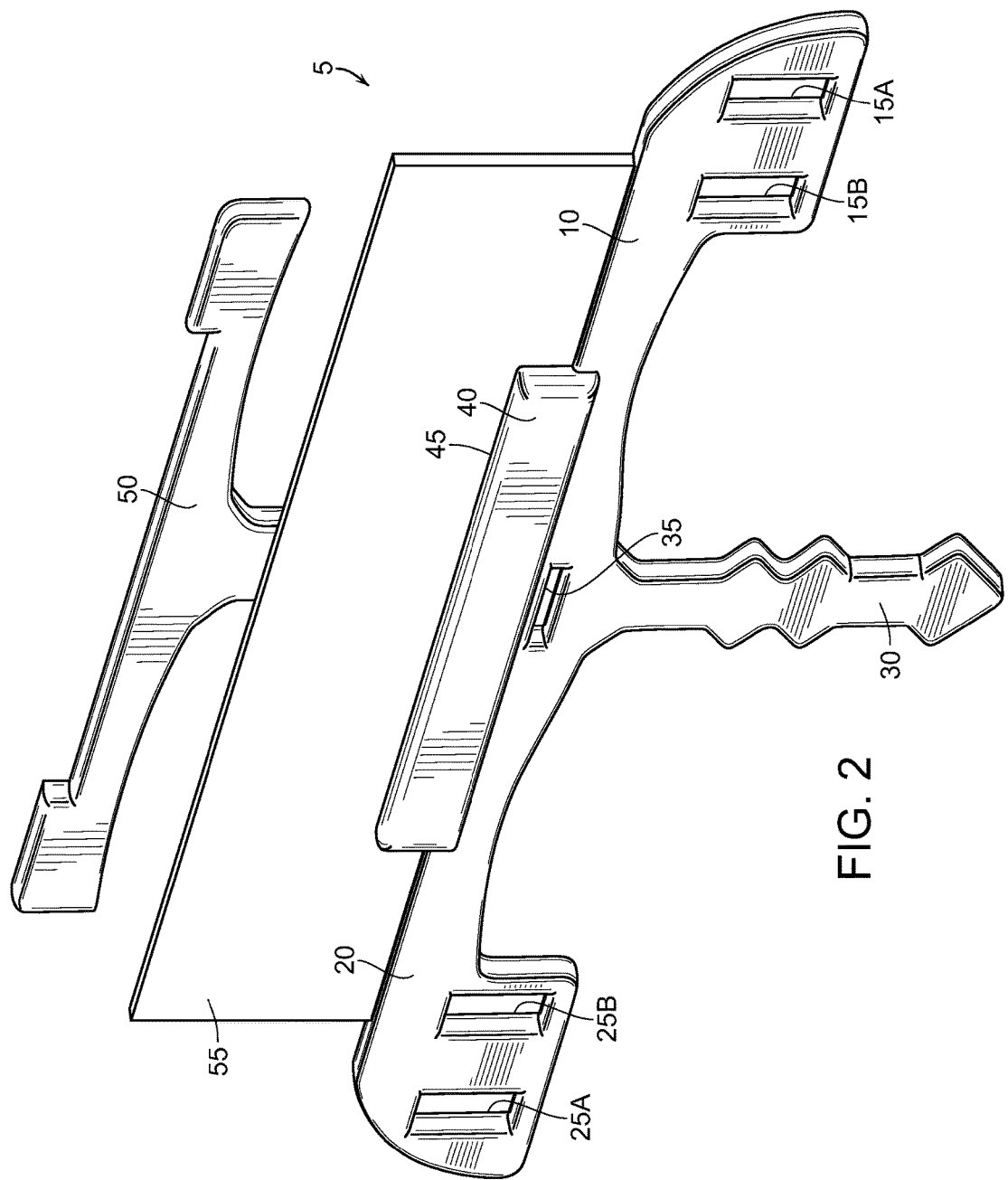
FIG. 2. is a depiction of the placement of the interchangeable banner in accordance with the present invention.
Figure 3:
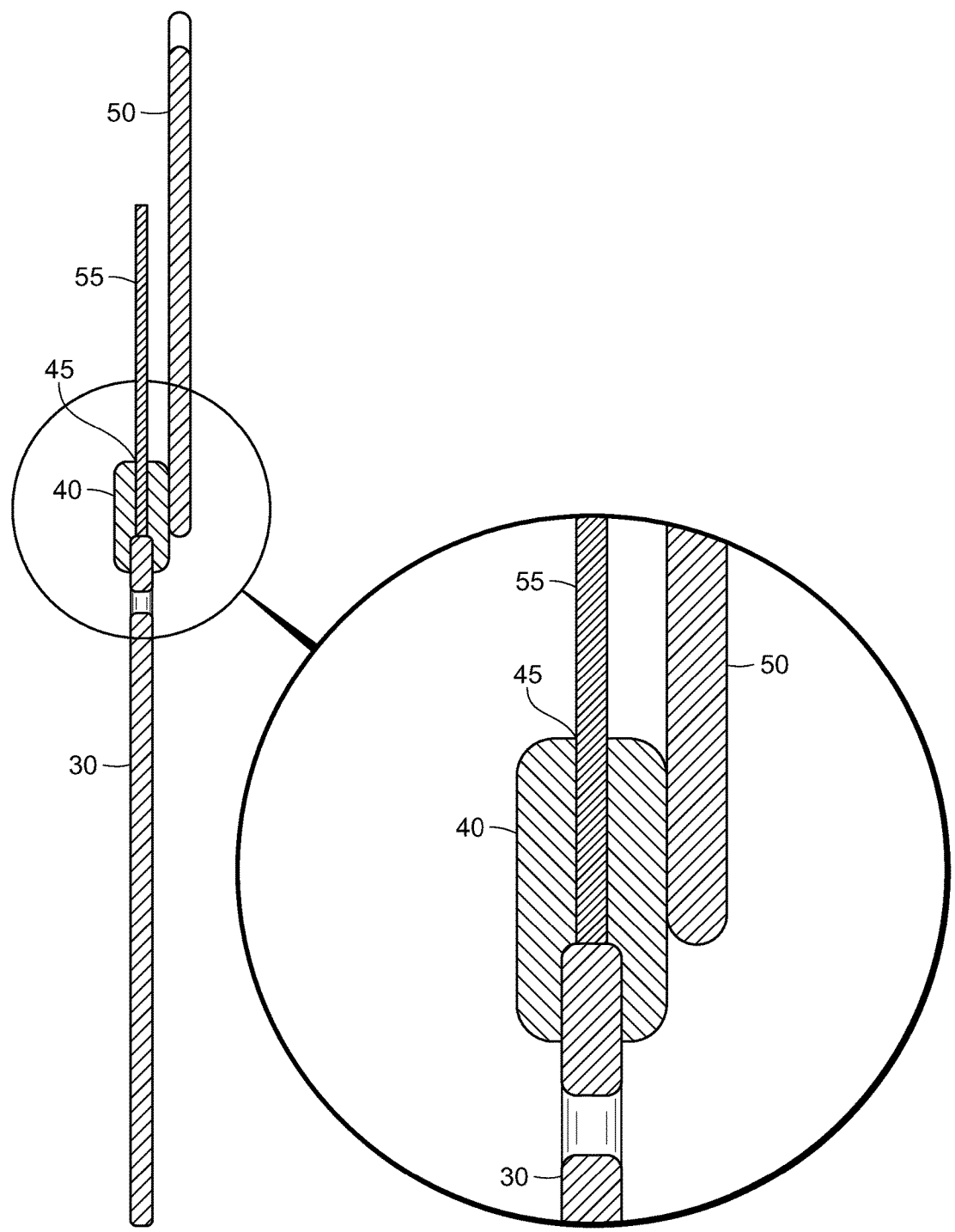
FIG. 3. is a pop out and close up depiction of the platform channel in accordance with the present invention.

Shown in FIG. 1 is an eyeglass frame attachment assembly of the present invention having interchangeable banner pieces in accordance with the preferred embodiment of the present invention. The eyeglass frame attachment assembly generally comprises a base 5 having a right upper frame 10, a left upper frame 20 and a center support 30 extending downward from the base and having a center portion. The left and right upper frames each comprise at least two arm groove, shown in FIG. 1 as right arm grooves 15A and 15B left arm grooves 25A and 25B. The grooves allow the invention to be adjusted to fit a variety of widths of the eyeglasses inserted therethrough. The base 5 may be attached to eyeglasses by passing the temple arms through one of the right arm grooves 15A or 15B and one of the left arm grooves 25A and 25B to ensure a secure fit about the temple arm. Groove 35 is where an optional center support strap (not shown) that passes through and locks for added support in the nose area of the attachment. A forward facing T-shaped wind guard 50 extends upward from the base 5 and can be permanently attached to or detachable from the base 5. The base 5 is attached to the platform 40 and the platform contains a channel 45 that secures an interchangeable forward facing banner 55 inserted into the channel 45. The base 5 may be constructed from a mold using materials such as ABS (acrylonitrile butadiene styrene) or other semi-rigid material. The platform 40 may be constructed from a mold using materials such as PLA (polylactic acid) or other rigid material. The T-shaped wind guard 45 may be constructed from a mold using materials such as PLA (polylactic acid) or other rigid material. The base 5, platform 40 and T-shaped wind guard 50 may be produced together as one piece, or glued together after individual production. The T-shaped wind guard 50 may be detachable from the base 5 such that it is only used in windy conditions.

The base 5 is designed such that it may fit on both wire frame glasses as well as thicker plastic or wooden frames. The base 5 is generally from about 7.62 to about 10.16 centimeters in length, from about 5.08 to about 7.62 centimeters in height and from about 2.0 to about 3.8 millimeters in width. The arm grooves 15A, 15B, 25A and 25B are generally from about 0.63 to about 0.76 centimeters in length, from about 1.24 to about 1.52 centimeters in height. The platform 40 is generally from about 6.35 to about 7.62 centimeters in length, from about 0.09 to about 1.06 centimeters in height and from about 0.51 to about 0.76 millimeters in width.

The platform 40 has a channel that is flexible to hold a banner from about 20.32 to about 27.94 centimeters in length, from about 5.08 to about 15.24 centimeters in height and the channel from about 0.01 to about 0.04 centimeters in width.

Interchangeable banner 55 may be made out of any materials such as paper, cardboard, or other semi-rigid or rigid material. The interchangeable banner may even be printed on home computers and added to the platform to form an expressive banner on the user's eyeglasses.

For the purposes of promoting an understanding of the principles of the invention, reference has been made to the preferred embodiments illustrated in the drawings, and specific language has been used to describe these embodiments.

However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An eyeglasses attachment frame assembly comprising
   a. a base with a top and bottom edge;
   b. a right upper frame with at least two portions shaped to accept a temple arm of eyeglasses;
   c. a left upper frame with at least two portions shaped to accept a temple arm of eyeglasses;
   d. a center support extending downward from the base and having a center portion;
   e. a forward facing platform with a top and bottom edge, with a channel along the top edge, wherein the top edge of the base and the bottom edge of the platform are connected and centered along the center support wherein the bottom edge of the platform is attached to the top edge of the base;
   f. a forward facing banner shaped to fit into the channel along the top edge of the platform; and
   g. a forward facing T-shaped wind guard extending upward from the base.

2. The assembly of claim 1 further comprising a center support strap.

3. The assembly of claim 2 wherein the center portion is shaped to accept the center support strap.

4. The assembly of claim 1 wherein the base, platform and T-shaped wind guard are produced as one continuous part.

5. The assembly of claim 1 wherein the base, platform and T-shaped wind guard are produced as individual parts.

6. The assembly of claim 5 wherein the T-shaped wind guard is detachable from the base.

7. The assembly of claim 1 wherein the banner material is semi-rigid or rigid.

8. The assembly of claim 1 wherein the base material is semi-rigid.

9. The assembly of claim 1 wherein the platform material is rigid.

10. The assembly of claim 1 wherein the T-shaped wind guard is rigid.

11. A method for changing the appearance of a pair of eyeglasses comprising:
    a. inserting the temple arms of a pair of eyeglasses through an eyeglasses attachment assembly, the assembly comprising:
       i. a base with a top and bottom edge;
       ii. a right upper frame with at least two portions shaped to accept a temple arm of eyeglasses;
       iii. a left upper frame with at least two portions shaped to accept a temple arm of eyeglasses;
       iv. a center support extending downward from the base and having a center portion;
       v. a forward facing platform with a top and bottom edge, with a channel along the top edge; wherein the top edge of the base and the bottom edge of the platform are connected and centered along the center support wherein the bottom edge of the platform is attached to the top edge of the base;
       vi. a forward facing banner shaped to fit into the channel along the top edge of the platform; and
       vii. a forward facing T-shaped wind guard extending upward from the base;
    b. selecting a banner to insert in the channel along the top edge of the platform.

12. The method of claim 11 wherein the eyeglasses attachment assembly further comprises a center support strap and wherein the center portion is shaped to accept the center support strap.

13. The method of claim 12 further comprising securing the center support strap to the center support.

14. The method of claim 11 wherein the base, platform and T-shaped wind guard of the eyeglasses attachment assembly are produced as one continuous part.

15. The method of claim 11 wherein the base, platform and T-shaped wind guard of the eyeglasses attachment assembly are produced as individual parts.

16. The method of claim 11 wherein the T-shaped wind guard is detachable from the base.

17. The method of claim 11 wherein the banner material is semi-rigid or rigid.

18. The method of claim 11 wherein the base material is semi-rigid.

19. The method of claim 11 wherein the T-shaped wind guard material is semi-rigid.

20. The method of claim 11 wherein the platform material is rigid such that the right frame fits around the right lens and the left frame fits around the left lens.

* * * * *